April 13, 1937.　　　J. O. HEINZE　　　2,076,722
MOTOR VEHICLE
Filed April 10, 1935　　　4 Sheets-Sheet 1

INVENTOR.
John O. Heinze,
BY
ATTORNEYS

April 13, 1937.  J. O. HEINZE  2,076,722
MOTOR VEHICLE
Filed April 10, 1935   4 Sheets-Sheet 2
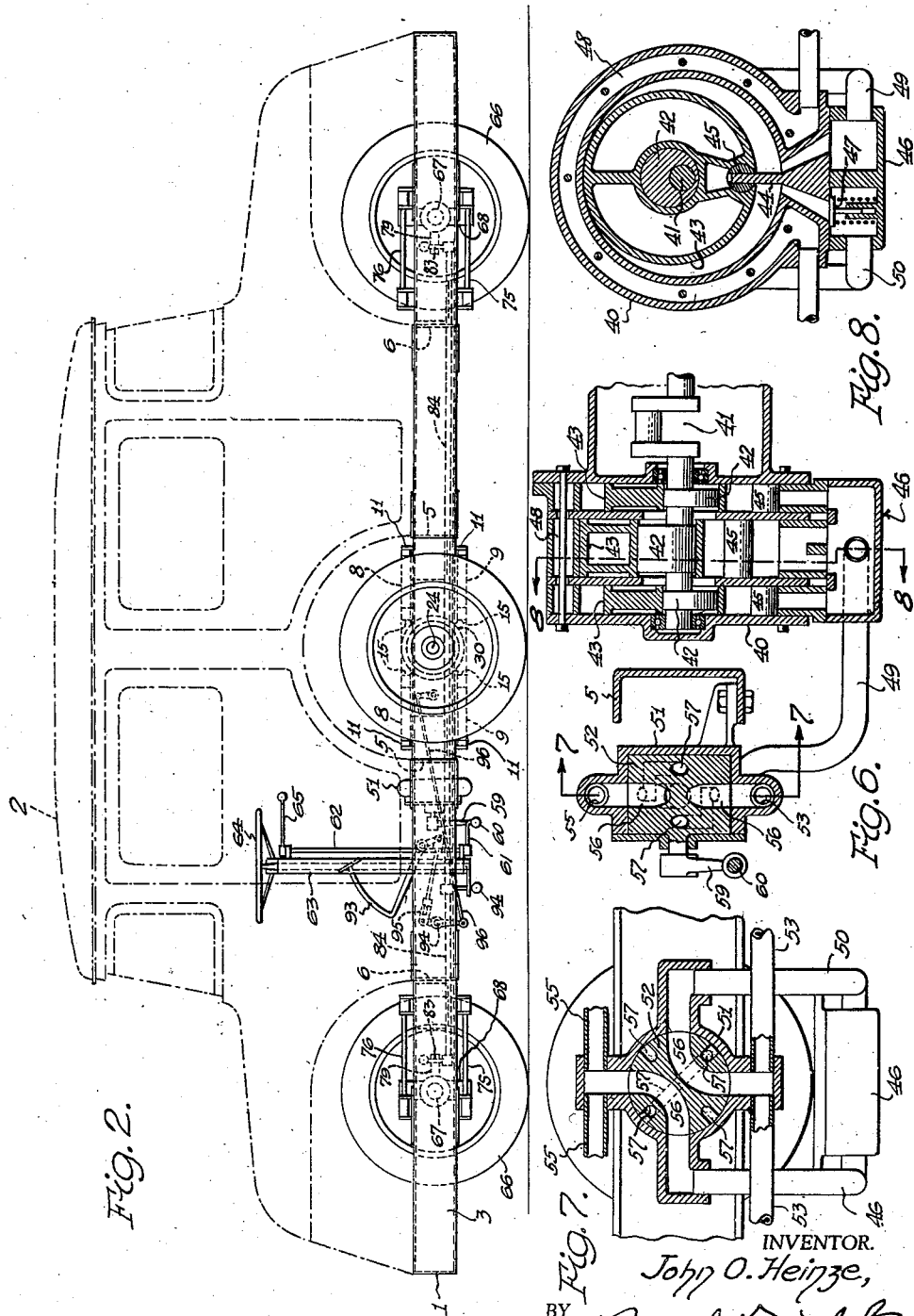
INVENTOR.
John O. Heinze,
BY
ATTORNEYS April 13, 1937.  J. O. HEINZE  2,076,722
MOTOR VEHICLE
Filed April 10, 1935  4 Sheets-Sheet 3
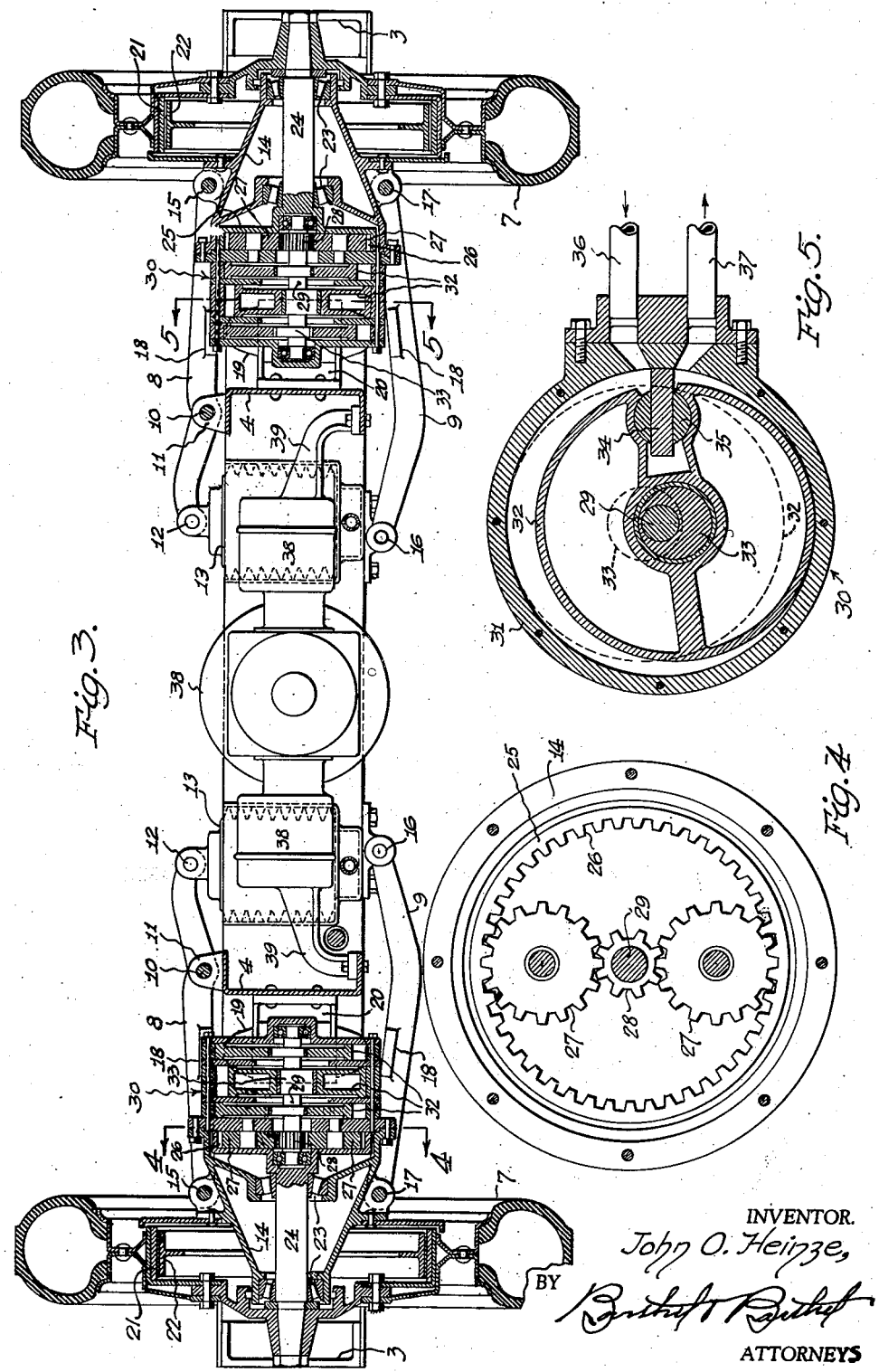

April 13, 1937. J. O. HEINZE 2,076,722
MOTOR VEHICLE
Filed April 10, 1935 4 Sheets-Sheet 4
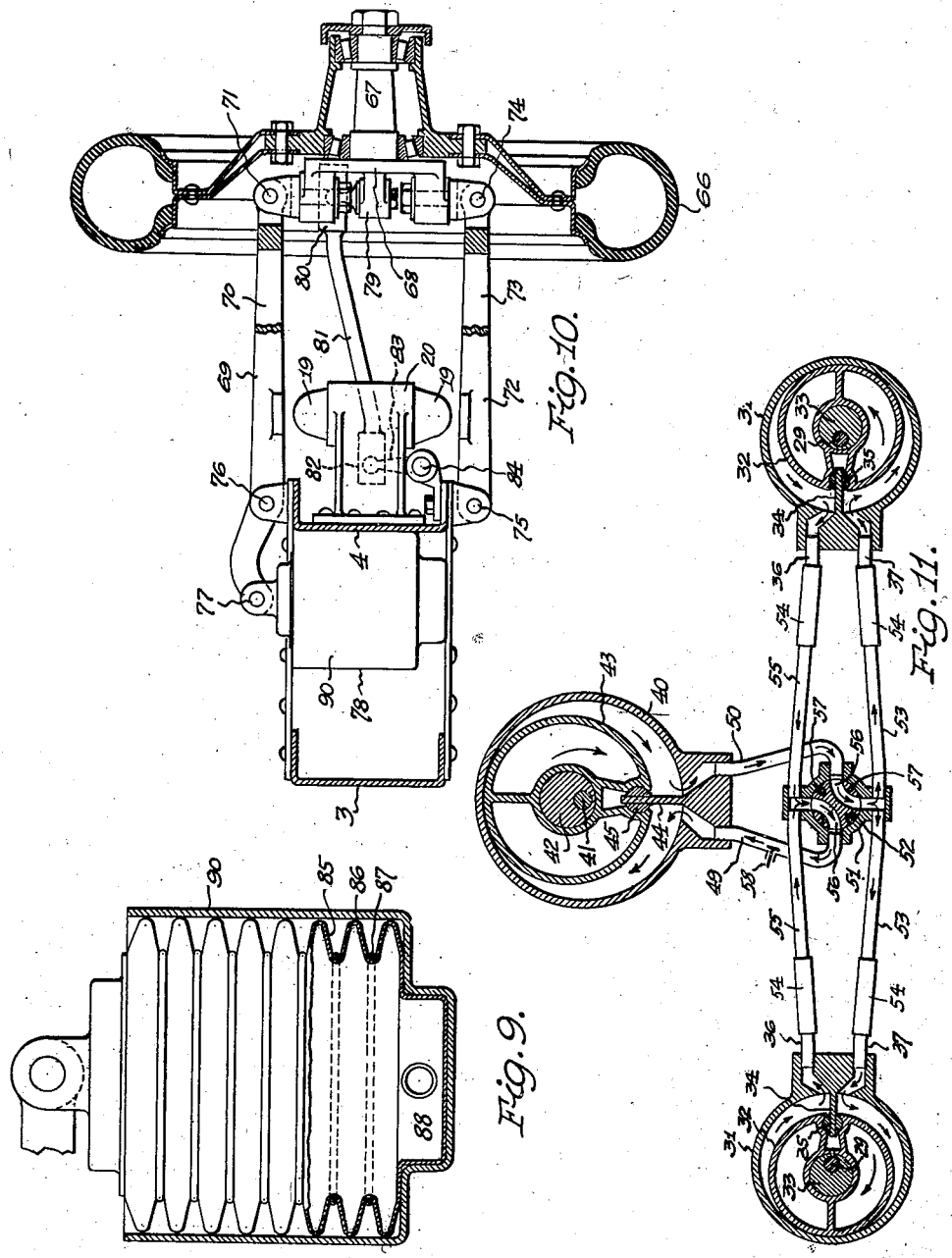
INVENTOR.
John O. Heinze,
BY
ATTORNEYS Patented Apr. 13, 1937

2,076,722

UNITED STATES PATENT OFFICE 2,076,722

MOTOR VEHICLE

John O. Heinze, Detroit, Mich., assignor to Heinze Development Company, Detroit, Mich., a corporation of Michigan Application April 10, 1935, Serial No. 15,662

9 Claims. (Cl. 180—21)

This invention relates to self propelled vehicles, and more particularly to an arrangement of driving and driven ground wheels and power generating and power transmitting instrumentalities in such vehicles.

Present day trend in automobiles is toward what is known as "stream lining" but with the present day arrangement of front steering ground wheels and rear driving wheels driven by a prime mover positioned at the forward end of the vehicle and from which power is transmitted to said rear wheels, complete stream lining is impossible from a practical standpoint.

An object of the present invention is to provide an arrangement, within a motor vehicle, of ground wheels, power generator, and drive for certain of said wheels, whereby complete stream lining of the vehicle is made possible; and to provide an arrangement whereby even distribution of weight is secured. A further object is to provide an arrangement whereby better ground contact of driving wheels and better maneuverability of the vehicle is secured through the relative arrangement of driving and steering ground wheels, and whereby the riding qualities of the vehicle are enhanced.

It is also an object to provide an arrangement permitting of and facilitating individual spring suspension of all ground wheels, and the individual driving of the driving wheels; and to provide for the location amidships, of a prime mover or internal combustion power generator, and the transmission of power therefrom to drive each driving wheel individually, including an air compressor driven by the engine to supply air under pressure to motors individual to the driving wheels.

It is also an object to facilitate steering and enhance maneuverability, and at the same time permit complete stream lining of the body of the vehicle, by providing a single steering ground wheel adjacent the forward end of the vehicle and a similar single steering ground wheel adjacent the rear end thereof, the driven ground wheels being located at the sides of the vehicle, midway between said ends and midway between said steering wheels so that all mechanism including the ground wheels, may be located within the confines of the chassis frame which follows the outlines of the streamlined body. Further objects are to provide a form of spring suspension especially adapted for individual suspension of each of the several ground wheels within the particular construction and arrangement shown, and to provide certain other new and useful features in steering and control systems especially adapted for simultaneous steering of the steering wheels and for control of flow of air under pressure to said wheel motors from said compressor; and to provide certain other new and useful features in the construction, arrangement and combination of parts, all as hereinafter set forth, reference being had to the accompanying drawings wherein Fig. 1 is a plan view of a chassis of a motor vehicle illustrative of an embodiment of the present invention;

Fig. 2 is a side elevation of Fig. 1 and illustrating, in dot and dash lines, a vehicle body in place upon the chassis;

Fig. 3 is an enlarged transverse section upon the line 3—3 of Fig. 1;

Fig. 4 is a sectional detail upon the line 4—4 of Fig. 3;

Fig. 5 is a section upon the line 5—5 of Fig. 3;

Fig. 6 is an enlarged section upon the line 6—6 of Fig. 1;

Fig. 7 is a section upon the line 7—7 of Fig. 6;

Fig. 8 is a section substantially upon the line 8—8 of Fig. 6;

Fig. 9 is an enlarged sectional elevation of a bellows structure forming part of the spring suspension mechanism shown in Fig. 10;

Fig. 10 is a side elevation, with parts in section, upon the line 10—10 of Fig. 1, of a spring suspension showing a steering ground wheel in vertical section pivotally connected thereto for steering movement; and Fig. 11 is a diagrammatic illustration of a system for supplying air under pressure to the motors on the drive wheels, from an air compressor driven by an internal combustion engine.

Figure 1:
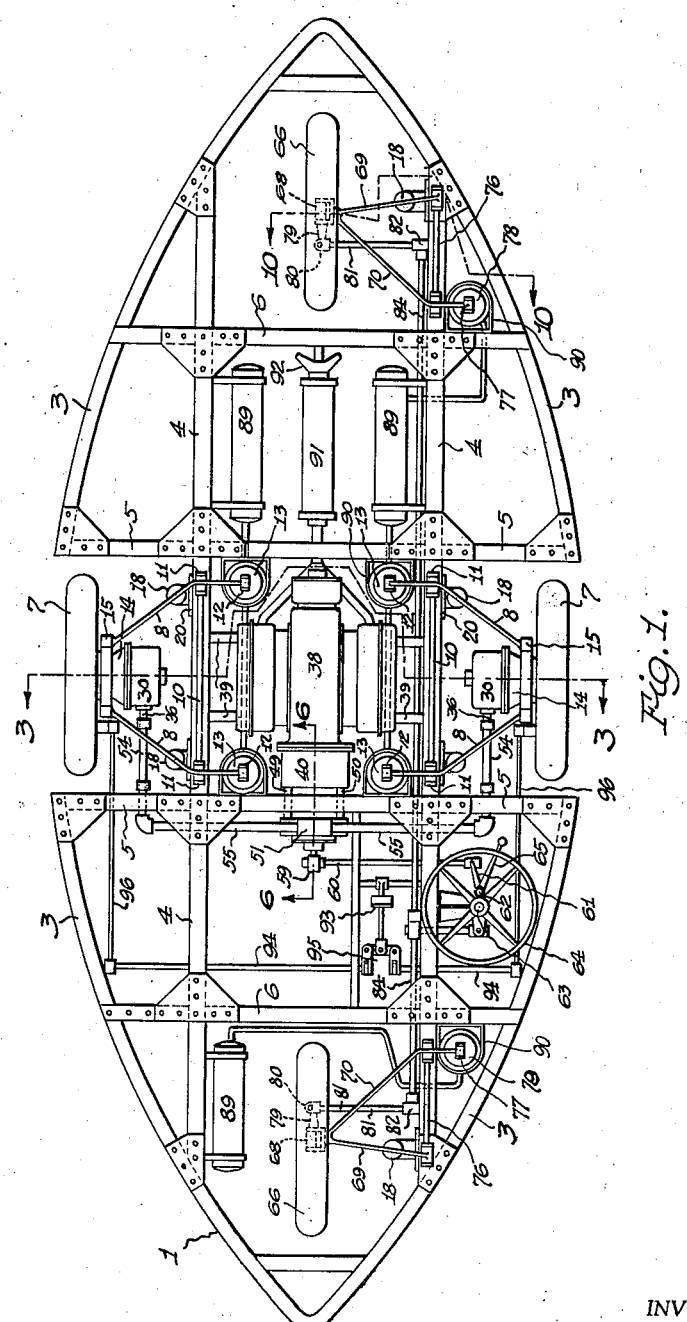

As shown more particularly in Fig. 1, the chassis frame indicated as a whole by the numeral 1, outlines, in plan view, the entire vehicle, the lower edge of the vehicle body, indicated by the numeral 2 and shown in dot and dash lines in Fig. 2, conforming strictly to the outline of said frame with no parts of the mechanism, including the ground wheels, projecting beyond the confines of said frame outline, and as the sides of this frame are curved and converge toward the front and rear ends of the vehicle, terminating in substantially sharp rounded ends, complete stream-lining of the vehicle is secured.

This chassis frame 1 comprises the outer curved channel members 3 connected by longitudinal parallel channel frame members 4, parallel cross members 5 and transverse members 6, all rigidly secured together in any suitable manner at their points of intersection to provide a rigid frame, and the members 3 stop where they meet the ends of the members 5 so that there is an opening or break in the continuity of the sides of the frame intermediate the ends thereof to accommodate side driving wheels 7, one at each side of the vehicle, each wheel being individually connected to each longitudinal frame member 4 inwardly from the extreme sides of the frame, by a pair of top arms 8 and a pair of bottom arms 9, the top arms being connected and pivotally mounted intermediate their ends, upon said frame member 4 by means of a pivot rod 10 mounted in bearing brackets 11 mounted upon and extending upwardly from the upper side of said frame member. These arms 8 extend beyond their pivotal support with their inner free ends pivotally connected, as at 12 to the upper ends of bellows members, each indicated as a whole by the numeral 13, each bellows serving the purpose of a compression spring to resist upward movement of the wheel 7 to the hub portion 14 of which wheel the outer ends of the arms 8 are pivotally attached, as at 15, and the inner ends of arms 9 of the lower pair, are pivotally connected as at 16 to the frame in any suitable manner and extend outwardly beneath the frame member 4 to permit of suitable pivotal connection 17 with the hub 14. The upper and lower pairs of supporting arms thus swing in substantial parallelism against the resistance of the two bellows, under load on the chassis frame, permitting the wheel 7 to move vertically relative to the frame and thus providing an individual spring suspension for each of the two driving wheels so that one of these wheels 7 may move upwardly relative to the frame entirely independent of the other; and to limit such movement of the arms of both pairs, relative to the frame, these arms are each formed with a laterally extending lug 18 intermediate its ends to engage limit bumper blocks 19 carried by brackets 20 secured to the outer side of the frame members 4.

Each driving wheel 7 is mounted upon its fixed hub 14 through the medium of a driven shaft, these wheels being each provided with a brake drum 21 and brake shoes indicated at 22, all arranged in an old and well known manner, and preferably, the hub 14 for each wheel 7 and which is yieldingly carried upon the outer ends of the arms 8 and 9 as described, is preferably of outwardly tapering conical form and provided, adjacent its inner and outer ends with bearings 23 for a short drive shaft 24 provided with a gear drum 25 on its inner end, the wheel 7 being keyed or otherwise fixed to the extreme outer end of said shaft. Within the drum 25 of each wheel shaft 24 is an internal ring gear 26 (see Fig. 4) and idler gears 27 for transmitting motion from a pinion 28 on the outer end of an eccentric shaft 29 of a rotary type of air motor indicated as a whole by the numeral 30, each of these motors comprising a cylindrical casing 31 divided by transverse partitions into a plurality of cylinders, each cylinder containing a piston 32 of less diameter than the internal diameter of its cylinder, whereby by mounting each piston 32 upon an eccentric portion 33 of the shaft 29 and anchoring the piston at one side, to the casing by means of a baffle member 34 projecting into a slot in the piston from the wall of the cylinder, and providing a pivotal joint member 35 within said slot within which said baffle may slide, the admission of air under pressure into each cylinder through an inlet pipe 36 at one side of said baffle and the exhaust of air through an outlet pipe 37 at the other side of said baffle, will impart a swinging movement to each piston within its cylinder and a sliding movement thereof upon said baffle, so that air pressure will hold said piston against the wall of its cylinder throughout its eccentric movement and rotary motion will be imparted to said shaft 29 through the offset in one direction of the eccentric 33 upon which one piston is mounted, and the offset in an opposite direction of the eccentrics upon which other pistons are mounted, the one piston being thus substantially at the end of its power stroke when the other pistons are at the beginning of their power stroke, all as shown in Fig. 5.

Obviously any other suitable form and construction of air driven rotary or other type of motors for driving the wheels 7 independently, may be provided, the type and construction shown being, however, particularly adapted for the purpose and to the present construction of individual wheel mounting.

To supply air under pressure to each of the rotary motors 30 for driving the drive wheels 7, a prime mover or power generator, preferably in the form of a double opposed type of internal combustion engine 38, as shown, is supported by brackets 39 on the frame members 4 and within the plane of the frame, between said members with the longitudinal axis of the cylinders of said engine and the longitudinal axes of said air motors 30 substantially in alignment, thus locating said engine midway between the drive wheels 7 and at a minimum height from the ground so that the power generating, the driving, the spring suspension, and substantially all mechanism will be located mainly within the plane of the chassis frame and beneath, or mainly beneath the floor of the body of the car, and the greater part of the weight of all of the operating mechanism of the vehicle will be carried by the chassis frame, midway of the ends thereof and directly between the two drive wheels, at the sides of the vehicle, whereby the preponderance of load is taken by these driving wheels and evenly distributed therebetween, the center of gravity of the entire vehicle being thus located midway between these side driving wheels and midway of the length of the vehicle, giving a balanced effect.

To provide a circulation of air under pressure for driving the wheel motors 30, an air pump indicated as a whole by the numeral 40, and preferably of the rotary type as shown in detail in Figs. 6 and 8, is bolted directly to the end of the crank shaft 41 of said engine extended to form the shaft of said pump, which pump is of substantially the same construction as the air motors 30, the extended end of the crank shaft 41 being provided with a plurality of eccentrics 42 corresponding to the eccentrics 33 of said air motors, a plurality of pistons 43 similar to the pistons 32, a baffle member 44 similar to the baffle 34, extending into a slot in each piston and slidable through a pivot member 45 mounted in said slot of each piston. The casing or wall of each cylinder is provided with an inlet passage at one side of each baffle and an outlet passage at the other side, these passages opening into a manifold casing 46, divided by a wall to form an inlet chamber and an outlet chamber for each cylinder, each outlet chamber being provided with a valve 47 therein to seat over the outer end of each outlet passage and prevent air under pressure from flowing back into the cylinder from said outlet chamber. The wall of the casing forming the several cylinders, is formed double to provide a water jacket 48 surrounding the several cylinders, and leading to the inlet chambers of the manifold 46 is an inlet pipe 49 and leading from the outlet chamber is a pipe 50, both pipes leading to a control valve casing 51 in which casing is a rotary valve 52. Leading from the lower part of said valve casing 51, as shown in Fig. 7, are conduit pipes 53 which extend transversely of the chassis frame to points adjacent the two motors 30 for driving the drive wheels 7, and are connected to the pipes 36 of said motors by short flexible tubular sections 54 as shown in Fig. 1 and diagrammatically illustrated in Fig. 11; and leading from the upper part of said casing 51 are similar conduit pipes 55 connected at their outer ends by like flexible sections 54 to the pipes 37 of said motors. These conduits 53 and 55 are thus directly connected to the motors 30 to deliver fluid under pressure from said air pump 40 to said motors and to conduct such fluid discharged by said motors, back to said pump, said flexible connections 54 permitting free movement of said motors relative to said conduits upon flexure of the spring suspensions for the driving wheels 7.

To control the flow of fluid to and from the pump 40, the rotary valve 52 is formed with passages 56 so arranged that when said valve 52 is turned to the position shown in Figs. 7 and 11, air or fluid will flow under full pressure through outlet pipe 50 of the pump and through one of the passages 56 of the valve, into the pipes 53 and thence to the inlet sides or pipes 36 of the motors, and the discharge of said motors will flow through the pipes 55, and through the other passage 56 of the valve, to the pipe 49 and back to the inlet side of the pump. Reversal of the direction of drive of the motors, may be effected by giving the valve 52 a quarter turn, thus connecting the pump outlet pipe 50 with the pipes 55, and connecting the pipes 53 with the intake pipe 49 of the pump. The fluid is thus circulated in a closed circuit through the pump and motors, and when desired, communication between pump and motors may be cut off by giving said valve an eighth of a turn, thus positioning the valve passages 56 with their ends intermediate the opening in the valve casing into which the several pipes 49, 50, 53 and 55 open.

In order to provide open flow circuits through said motors when the control valve is in intermediate position with the pump cut off from communicating with said motors, said valve is formed, intermediate the passages 56, with crossover passages 57 arranged at right angles to each other so that when said valve is turned to this intermediate position, the pipes 53 will be connected by one of said passages 57 with the pipes 55 and an open flow circuit for each motor will be provided, so that if, at the time, the vehicle should be progressing in either direction and the motors thus driven by the rolling of the driving wheels 7 on the ground, the fluid will be free to circulate through the motors without creating a back pressure which would resist rotation of the motors and thus exert a braking action on said wheels. This open flow circuit thus permits the vehicle to coast and provides for what is known as "free wheeling".

Where the system is operated upon an elastic or compressible fluid, such as air, when the system is put into operation after it has been at rest, the starting of the pumps, will, due to the compressibility of the air in the system, create a partial vacuum in that side of the system which is connected to the intake side of the pump, due to the resistance of the motors, and to decrease this vacuum by supplying additional air so that a pressure may be built up sufficient to operate the motors, an air inlet valve indicated at 58 in Fig. 11, is provided in the inlet pipe 49 of the pump or any other suitable part of the intake side of the system, said valve being arranged to be seated to close the same, by pressure within the pipe or system and to open and admit atmospheric air when a partial vacuum is created in said pipe or system.

The control valve 52 is preferably of cylindrical form with a stub-shaft projecting from one end thereof, and to the outer end of this stub, an operating arm 59 (Fig. 6) is secured. Connected to the free end of this arm, is a connecting rod 60, the opposite end of which rod is connected to an arm 61 on the lower end of a rod or shaft 62 attached in any suitable manner to a steering column 63 to extend parallel therewith to near the upper end thereof below a steering wheel 64 thereon where said rod 62 is provided with a hand control lever or handle 65 for operation by the driver of the vehicle to operate the control valve 52.

Due to the tapering or pointed end formations of the chassis frame, this shape of frame lends itself particularly to the location within said ends adjacent the points or extreme ends thereof, of steering ground-wheels 66, and this arrangement of a single ground steering-wheel at each end of the vehicle, greatly facilitates the steering of the vehicle and its maneuverability as either end may be swung laterally in either direction and the other end simultaneously in an opposite direction, each wheel being mounted to rotate freely upon a spindle 67 which is mounted for steering movement, upon the upwardly extending axis of a head 68 with which said spindle is integrally formed, all as shown in detail in Fig. 10.

A spring suspension quite similar to the spring suspension for each driving wheel 7, is provided for each steering wheel 66, this suspension comprising a pair of upper arms 69—70 having a common pivotal connection 71 at their outer ends to the upper end of the spindle head 68, and a lower pair of arms 72 and 73 having a common pivotal connection 74 at their outer ends, to the lower end of said head 68.

At their inner ends, the lower arms are pivotally connected at 75 to the under side of the frame member 4, and the upper arms 69—70 are pivotally attached to the upper side of the frame member 4 and connected to turn together, by a rod 76 mounted in bearings on said frame member with the inner end of the arm 70 extended beyond such pivot rod and pivotally attached at its inner end, as at 77 to the upper end of a bellows indicated as a whole by the numeral 78. The wheels 66 are thus each pivotally connected to the chassis frame through the medium of two parallel pairs of arms with up and down swinging movement of these arms yieldingly resisted by the bellows 78, and as each wheel is pivotally connected to the outer ends of these pairs of arms, to turn upon the upwardly extending axis of the pivotal connection of its spindle head 68 with said arms, by providing each head for each wheel with a laterally extending rigid steering arm 79 and pivotally connecting the free ends of said arms by means of universal joints 80 with the outer ends of connecting rods 81, and connecting the inner ends of said connecting rods by means of universal joints 82 to the upper ends of rigid arms 83 on a longitudinally shiftable rod 84 mounted in bearing brackets on the frame member 4 and extending parallel therewith from front to rear of the chassis the two steering wheels 66 may be simultaneously turned in opposite directions by the shifting of said rod 84, to direct the front end of the vehicle laterally in one direction and direct the rear end of the vehicle simultaneously in an opposite lateral direction and to so shift the rod 84 in steering the vehicle any suitable connection is provided between said rod and the lower end of the shaft of the steering column, upon the upper end of which shaft the steering wheel 64 is secured.

In detail, the two bellows 13 for the spring suspension of each driving wheel 7 and the bellows 78 for the spring suspension of each steering wheel 66, comprises, as shown in Fig. 9, a bellows proper, formed with a flexible wall 85, preferably of rubber, which wall is folded to form parallel, hollow outwardly projecting ribs 86 with interposed external grooves with metal rings 87 seated in the bottoms of said grooves to prevent undue expansion of the bellows and to maintain its cylindrical shape. The lower end of each bellows is formed with an air chamber 88 and this chamber of each of the several bellows is in free communication with an air tank 89 (see Fig. 1) for the purpose of increasing the volume of air acted upon when the bellows is compressed under load, thus obviating the necessity for a bellows of extended length, and preferably, as shown in Fig. 9, the bellows is inclosed, except its upper end to which the operating arm is attached, by a sheet metal cup 90 or casing to protect the bellows and to form a support therefor.

As shown in Fig. 1, the engine 38 is provided with an exhaust muffler 91 supported within the chassis frame at the rear of the engine with its outlet end provided with a V-shaped outlet pipe 92 to direct the exhaust laterally away from the sides of the rear steering wheel 66.

The service brakes including brake drum 21 and shoes 22 in each of the two drive wheels 7, are operated in the usual manner by a foot pedal 93 operatively connected to transverse shafts 94, one for transmitting operating power to each brake, and said pedal being connected to the adjacent ends of said shafts through an interposed equalizer, indicated at 95, the outer ends of said shafts 94 being connected by rods 96 in the usual or any suitable manner to the brake shoe actuating means carried by the wheels.

The described arrangement of driving wheels at opposite sides of the vehicle midway between a single steering ground wheel at each end of the vehicle, lends itself particularly to its application to a chassis frame outlining a body of complete stream line contour, i. e., a body curved from end to end and terminating in comparatively sharp but rounded ends in plan view. This application is made possible due to the fact that the single wheels may be located wholly within the outlines of these pointed ends of the chassis frame without projecting beyond the outlines of said ends, and the side driving wheels may be located within recesses in the widest part of the frame, thus bringing all ground wheels within the outline of the frame and body.

By locating the prime mover or internal combustion engine midway between the side driving wheels and at both the longitudinal and transverse center of the chassis, a preponderance of the weight of the chassis is centralized and a balanced effect secured. Further, the arrangement lends itself particularly to individual or independent spring suspension of all ground wheels, thus giving the maximum in riding qualities to the vehicle; and by providing individual motor drive for each drive wheel, weight is reduced by dispensing with the necessity for change speed transmission mechanism and axles, the independent spring suspension having direct connection to the chassis frame, eliminating any necessity for axles, and direct transmission of fluid driving power from engine driven pump to wheel motors, making geared power transmitting means unnecessary.

The form and construction of these fluid operated motors 30 is such as to particularly adapt them for direct mounting upon the disc wheels 7, and the arrangement of rotary air pump direct connected to engine crank shaft, with a single control valve to control the circulation of air from pump to motors and back to pump, is such as to greatly simplify the construction and the control and the operation of the vehicle. The maneuverability of the vehicle is greatly increased by the provision of a single ground steering-wheel at each end, the vehicle being thus maneuvered by swinging it about a central point, thus making it possible to get into and out of a small space between parked cars, the stream line shape of the vehicle greatly enhancing such maneuverability.

While a particular construction and arrangement of power and control devices has been shown, it will be understood that such construction and arrangement may be varied without departing from the spirit of my invention and such changes are contemplated.

What I claim is:—

1. In a motor vehicle, the combination of a chassis frame having curved side members forming the outline of the vehicle in plan view and converging toward the ends of the frame, ground engaging driving wheels, said side members of said frame being interrupted opposite said driving wheels and said frame including transverse members at front and rear of said wheels and longitudinal members spaced from the inner sides of said wheels, a ground engaging steering wheel between said sides of said frame adjacent the places of convergence of said sides at each end of said frame, means for yieldingly connecting said driving wheels to said longitudinal frame members inwardly from said wheels, means for driving said driving wheels and permitting individual yielding movement of said wheels, and means for turning said steering wheels simultaneously in steering the vehicle.

2. In a motor vehicle, the combination of a chassis frame having sides curved in plan view and converging toward each end of said frame to form pointed ends, said frame being adapted to support a body conforming in plan view to the outline of said frame to give stream lining, a ground engaging steering wheel within each pointed end of said frame and wholly within the outline thereof in plan view, means for individually and yieldingly connecting each steering wheel to said frame, means for connecting said wheels to turn together in steering the vehicle, a ground contacting driving wheel at each side of said frame and wholly within the outline thereof in plan view, means forming an individual yielding connection for each of said driving wheels to said frame, and separate means for driving each of said driving wheels.

3. In a motor vehicle, the combination of a chassis frame, ground contacting steering wheels, one at each end of said frame, ground contacting driving wheels, one adjacent each side of said frame and midway of the ends thereof and each pivotally connected to said frame inwardly from said wheel for movement independently of the other and of said frame, to provide for knee action of said wheels, a power plant mounted upon said frame between said driving wheels, a separate motor unit carried by each driving wheel and movable therewith, flexible means on the frame for transmitting power from said plant to drive each of said motors independently of the other and permit free movement of each connection of each wheel to said frame, yieldable means for resisting movement of each of said steering and driving wheels relative to said frame to yieldingly support the load of said frame upon said wheels, and means for simultaneously turning said steering wheels in opposite directions in steering the vehicle.

4. In a motor vehicle as characterized in claim 3 and wherein said chassis frame comprises side members curved in the direction of their length and converging toward the ends of the frame to outline a frame which in plan view has pointed ends and curved sides for the support of a body stream lined in plan view, and wherein said steering wheels are located within said pointed ends of said frame, and wherein said driving wheels are located inwardly of said frame outline at opposite sides of the frame and midway of the length thereof.

5. In a stream-lined motor vehicle, the combination of a chassis frame forming the outline of said vehicle in plan view, and having side members curved in the direction of their length and converging toward each other to form substantially pointed frame end portions, a body conforming in plan view to the outline of said frame, driving ground-wheels connected to said frame inwardly from the sides thereof and midway of the length of the vehicle to position said wheels wholly within the said outline of the vehicle, steering ground-wheels each pivotally supported to turn upon an upwardly extending axis, wholly within the outline of each pointed end portion of said frame, means for operatively connecting said steering wheels to turn the same simultaneously in opposite directions, power means mounted upon each driving wheel at the inner sides thereof for driving the same, power generating means mounted on said frame centrally thereof midway between said driving wheels, and means for transmitting power from said power generating means to said power means on each driving wheel.

6. In a motor vehicle as characterized in claim 2, and including power generating means on said frame midway between said driving wheels; and wherein said means for driving each of said driving wheels includes a driving unit mounted upon each driving wheel for movement therewith and a flexible connection to each driving unit to transmit power from said power generating means to permit free individual yielding movement of each driving wheel.

7. In a motor vehicle, as characterized in claim 2, and wherein said chassis frame includes longitudinal frame members extending parallel with and at a distance from the inner sides of said ground wheels, and wherein said means for individually connecting each of said wheels to said frame includes parallel arms pivotally connected at their outer ends to the mounting structure of the adjacent wheel and adjacent their inner ends to the upper and lower sides of said adjacent frame member with one of said arms extending inwardly beyond said frame member, and yieldable means connected to said extended end of said arm to resist upward swinging of the outer ends of said arms and wheel carried thereby.

8. In a motor vehicle as characterized in claim 2 and wherein said chassis frame includes longitudinal frame members spaced from one side of said ground engaging wheels, and wherein said means for pivotally connecting each of said wheels to said chassis frame includes two pairs of arms with the arms of one pair pivotally connected to one of said frame members at spaced apart points longitudinally of said member and with said pairs of arms pivotally connected to a wheel mounting member at vertically spaced points, whereby said mounting member is braced against movement in the direction of the length of said frame and vertical swinging movement of said arms and up and down movement of said wheel relative to said frame is permitted, and means for yieldingly resisting said swinging movement in one direction.

9. In a motor vehicle of the character described, the combination with a chassis frame having longitudinal members and ground wheels spaced laterally from said members and mounted upon individual wheel mountings; of driving units carried by and individual to said wheels, power generating means mounted on said frame, means for transmitting power from said generator to each of said driving units and permitting free movement of each wheel relative to said frame, and means for individually and yieldingly connecting each wheel to one of said frame members, said means including two pairs of arms, the arms of each pair being pivotally connected adjacent one end to said frame member and at the opposite end to said wheel mounting with said arms of each pair extending in parallelism and with said arms of each of said pairs of arms positioned at opposite sides of the vertical axial plane of said wheel, one of said arms being extended beyond its pivotal connection to said frame member, and yieldable means connected to the extended end of said arm to resist relative vertical movement of said frame and wheel.

JOHN O. HEINZE.